United States Patent [19]

Bourke et al.

[11] 4,267,500

[45] May 12, 1981

[54] CONTROL COOLING MEANS

[75] Inventors: Robert F. Bourke, Kamiah, Id.; David K. Johansen, Lake-in-the Hills, Ill.

[73] Assignee: Gould Inc., Rolling Meadows, Ill.

[21] Appl. No.: 943,628

[22] Filed: Sep. 19, 1978

[51] Int. Cl.³ .............................................. H02P 7/00
[52] U.S. Cl. .................................... 318/806; 318/811; 363/97; 363/141
[58] Field of Search .................................... 363/14–17, 363/141, 41, 26, 95, 97; 318/806–811; 361/383–384, 379

[56] References Cited

U.S. PATENT DOCUMENTS

| | | | |
|---|---|---|---|
| 2,959,723 | 11/1960 | Lordo | 363/15 |
| 3,059,164 | 10/1962 | Johnson | 363/141 |
| 3,373,334 | 3/1968 | Geisz et al. | 363/26 |
| 3,869,566 | 3/1975 | Smith | 363/26 X |
| 4,148,097 | 4/1979 | Deisch | 363/26 |

*Primary Examiner*—William M. Shoop
*Assistant Examiner*—Peter S. Wong
*Attorney, Agent, or Firm*—Wegner, Stellman, McCord, Wood & Dalton

[57] ABSTRACT

Cooling means for cooling a control such as for use in controlling the operation of electric vehicles or the like. The control utilizes a direct current battery power supply and includes an inverter for delivering alternating current to an alternating current motor of an air moving structure, such as a fan, provided for cooling the control during the operation thereof. The circuit is arranged to cause the fan to have variable power as a direct function of the load demand of the control circuit so that maximum cooling occurs when the load demand in the control is maximum and minimum cooling occurs when the load demand is minimum. The circuit is arranged to maintain an effectively constant volt-second duty cycle characteristic at the control power supply to the air moving structure whereby the variation in power developed by the motor thereof is a function of the duty cycle characteristics of the control power supply as applied to the motor. The control may include an oscillator and ramp for providing, in combination with a feedback signal from the output of the control power supply, a variable duty cycle control of the inverter of the control so as to provide the desired maintained volt-second characteristic of the control power supply.

20 Claims, 1 Drawing Figure

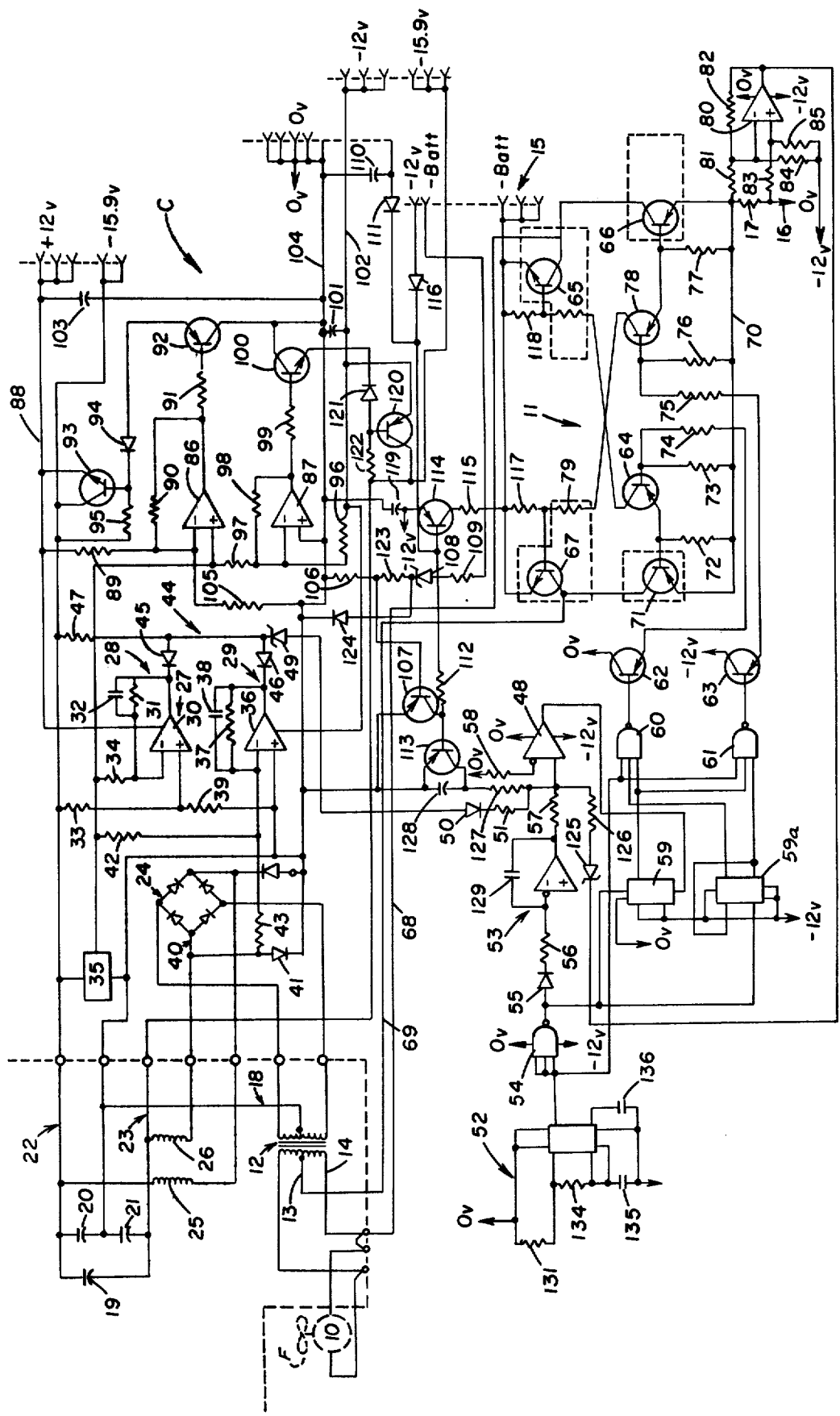

CONTROL COOLING MEANS

BACKGROUND OF THE INVENTION

1. Field of the Invention

This invention relates to control systems and in particular to means for cooling a control having a variable demand load so as to provide a correspondingly variable cooling effect.

2. Description of the Prior Art

In controls such as for use in electric vehicles, substantial power requirements may be had from time to time, such as when the main contactors of the control are energized. While many of the elements of such a control are inductive or capacitive, a substantial amount of heating results from the resistive impedance of the control elements. Such undesirable heating not only wastes the battery power but also adversely affects the life of the control. One solution to this problem has been to provide a fan or the like to maintain the control at a desired temperature level.

SUMMARY OF THE INVENTION

The present invention comprehends an improved control circuit utilizing an alternating current fan and inverter means in the control for converting the direct current power supply from a vehicle battery or the like to the necessary alternating current voltage suitable for operating the fan motor.

The control circuit includes rectifier means for rectifying the alternating current to provide a desired power supply for operating the main load elements of the control, which illustratively may comprise contactor coils and the like. The control circuit includes means for regulating the output control power supply voltage and means responsive to sag in that voltage so as to provide a suitable signal for varying the duty cycle of the inverter of the control. The variable duty cycle output of the inverter is utilized in conjunction with capacitive voltage control means so as to substantially maintain the output control voltage as desired.

As a result of the variation in the duty cycle of the alternating current produced by the inverter of the control, an automatic correlation is effected in the power developed by the fan motor with that of the load of the control so that when the load demand is high, the fan is automatically driven at maximum power so as to provide maximum cooling of the control. Alternatively, when the load demand is low, the fan is automatically driven with less power so as to provide an effectively minimum cooling of the control and thereby maintaining efficiency in the utilization of the overall system.

To protect the inverter components, the control includes means for limiting the current. Further, to protect the system, the control is arranged so as to cause the duty cycle to be zero when the control is initially energized and means for causing the duty cycle to increase slowly to the desired duty cycle necessary to maintain the desired control voltage at the particular load requirement.

The means for controlling the duty cycle may include regulator means responsive to the outut voltage of the control and a comparator responsive to a sag in the voltage. The comparator may be fed by a ramp signal generator from an astable oscillator and the inverter duty cycle is obtained by providing a signal from the comparator produced by the signal from the regulator and the ramp signal.

A novel flip-flop circuit is provided for providing the duty cycle signal to the inverter in single pulses on each of the alternating cycles developed by the inverter.

The oscillator may be set to provide a frequency of approximately 65 Hz. and the control may be arranged to provide suitable control of a fan having a nominal 120 v. AC rating.

Thus, the control system of the present invention is extremely simple and economical of construction while yet providing the highly improved correlated cooling functioning as discussed above.

BRIEF DESCRIPTION OF THE DRAWING

Other features and advantages of the invention will be apparent from the following description taken in connection with the accompanying drawing wherein the FIGURE is a schematic wiring diagram illustrating a control circuit embodying the invention.

DESCRIPTION OF THE PREFERRED EMBODIMENT

In the exemplary embodiment of the invention as disclosed in the drawing, a circuit C for controlling a control circuit cooling fan is shown to comprise an inverting circuit generally designated 11 which provides a variable duty cycle to an alternating current fan motor 10 through a suitable transformer which, in the illustrated embodiment, comprises an auto-transformer 12. The primary winding of transformer 12 on lines 13 and 14 is connected through inverter 11 between a −Batt signal at 15 and to a zero volt bus 16 through a shunt resistor 17 which serves to limit the current. The voltage on the inverter varies with the voltage of the battery supplied from terminal 15 and is regulated by the control to produce approximately 130 volts AC for powering the fan motor 10. As will be obvious to those skilled in the art, where the fan motor has a different voltage rating, the transformer may be suitably selected or where the fan motor has a rating matched to the control voltage, the fan motor may be connected directly thereto.

The secondary winding of transformer 12 is connected through line 18 to a capacitor voltage supply circuit comprising capacitors 19, 20 and 21. The capacitors 19, 20 and 21 are used to maintain the control output voltage on line 22 at +15.9 volts and on line 23 at −15.9 volts. When the load is light, these capacitors are readily charged to their peak value.

Capacitors 19, 20 and 21, as shown, are connected to a diode bridge rectifier 24 through a pair of inductors 25 and 26. The bridge rectifier 24 is also connected to the secondary winding of transformer 12.

A regulating circuit generally designated 27 comprises a two-input negative OR gate 44 including diodes 45 and 46. The negative OR gate input 28 comprises an amplifier 30 with a parallel combination of a feedback resistor 31 and capacitor 32. The noninverting input of amplifier 30 is connected to +15.9 v on line 22 through a resistor 33 and the inverting input is connected through a resistor 34 to the output of a precision voltage source 35. The negative OR gate input 29 comprises an amplifier 36 with a parallel combination of a feedback resistor 37 and capacitor 38. The noninverting input of amplifier 36 is connected through a resistor 39 and resistor 33 to line 22 and it is also connected to terminal 40 of the bridge rectifier 24 through a diode 41. The inverting input of amplifier 36 is connected to the output of the precision voltage source 35 through a resistor 42 and is also connected to terminal 40 through a resistor 43. A resistor 47 is connected between +15.9 v on line 22 and a control comparator 48 through a zener diode 49, a diode 50 and a resistor 51. The negative OR gate 44 attempts to regulate plus and minus 15.9 volts to the comparator 48. A sag in either voltage below 15.9 volts provides a control signal to the comparator for use in varying the duty cycle of the inverter.

The astable oscillator generally designated 52 operates at a frequency of approximately 130 Hz. to provide a signal which is fed to a ramp generator 53 through an inverter 54 and a series combination of a diode 55 and resistor 56. The ramp generator 53 provides a positive going ramp from −11 v to −3 v over a 7.6 ms. period. This signal is input to the noninverting terminal of control comparator 48 through a resistor 57. The inverting input of comparator 48 is connected to zero volts through a resistor 58. The control comparator 48 compares the voltage supplied from negative OR gate 45,46 and produces an output duty cycle wave due to the ramp input from generator 53. The output duty cycle from comparator 48 is then fed to the reset of a single pulse per cycle flip-flop 59.

The output of the flip-flop 59 is connected through a pair of control gates 60 and 61 to the power supply inverting circuit 11 through a pair of control transistors 62 and 63, respectively. A toggle flip-flop 59a is further connected to the control gates 60 and 61 and flip-flop 59 for causing the signal to the inverting circuit 11 to be cyclically reversed, thereby to produce the desired duty cycle controlled alternating current output of the inverting circuit 11.

Thus, the comparator 48 compares the signal from the negative OR gate 44 with the ramp signal so as to provide the variable duty cycle alternating signal to the inverting circuit 11. The control gates 60 and 61 provide signals from the flip-flops 59 and 59a to gates 60 and 61 for controlling this functioning. The circuit is arranged so that while there may be some noise on the control comparator signal, the flip-flop 59 is allowed to provide an output only once each cycle. The toggle flip-flop 59a provides the 50 percent duty cycle necessary to effect the desired alternating current output of the inverting circuit 11 so as to have equal enabling times in each of the reverse cycles.

More specifically, the transistors 62 and 63 operate as driver transistors so that when the transistor 62 is on, a −12 v input is provided to the inverting circuit transistor 64 and, thus, the transistor 64 and transistor 65 of the inverting circuit are on. The drive transistor 63 must be off at this time due to the nonenabling action of the inverter gates at this time.

The collectors of transistor 65 and transistor 66 of the inverting circuit 11 are connected in common to provide one output from the inverting circuit and the collectors of the transistor 71 and transistor 67 are connected in common to provide the other output from the inverting circuit. These outputs are connected to the transformer 12 through lines 68 and 69, respectively.

As shown in the drawing, the inverting circuit is connected to a bus 70 connected between transistor 66 and a transistor 71 of the inverting circuit and the resistor 17 so as to be at an effective zero volt voltage. This bus is connected to the transistors 64, 66 and 71 through a plurality of resistors 72, 73, 74, 75, 76 and 77 in the conventional manner. A transistor 78 is connected between transistor 66 and transistor 67 through a resistor 79.

The inverting circuit 11 comprises a conventional inverting circuit with the duty cycle thereof controlled by the signal delivered through the drive transistors 62 and 63.

The shunt resistor 17 serves to sense the current and comparator 80 will limit the current to a preselected value which, illustratively, may comprise 7 amperes peak so as to protect the inverting circuit transistors, as discussed above. Connected across the resistor 17 is a resistance network including resistors 81, 82, 83, 84 and 85, which determines the current limit threshold.

For certain purposes, it is desirable to provide a regulated ±12 v output and to this end, the control circuit includes a +12 v regulator 86 and a −12 v regulator 87. The regulator 86 is connected to a +12 v line 88 through a resistor 89 and is provided with a feedback resistor 90 and series resistor 91 connected to a transistor 92 connected to the collector of a transistor 93 through a diode 94. A shunt resistor 95 may be connected in parallel with the transistor 93 to the 15.9 v. line 22.

Regulator 87 is connected to the −12 v. line through a resistor 96 and to the regulator 86 through a resistor 97. A shunt resistor 98 is connected across the regulator 87 and a series resistor 99 is connected in series with a transistor 100 connected through a capacitor 101 to the −12 v. line 102. A capacitor 103 is connected between the line 88 and a line 104 connected to the zero volt supply and to the regulator 87. A resistor 105 is connected between regulators 86 and 87 and is connected in series with a resistor 106 to a transistor 107 and a reference diode 108 connected through a resistor 109 to the −Batt. voltage supply.

A capacitor 110 is connected from line 104 through a diode 111 and through a resistor 112 to a transistor 113. A transistor 114 is connected through a resistor 115 to the −Batt. voltage input 15. A diode 116 is connected from the −12 v. supply to the resistor 112 and transistor 114. A resistor 117 is connected between the −Batt. supply and transistor 67 and a resistor 118 is connected between the −Batt. supply and transistor 65.

A capacitor 119 is connected from the lead 104 to transistor 114.

A transistor 120 is connected through a reference diode 121 connected to transistor 100. A shunt resistor 122 is connected in parallel with transistor 120 to the −15.9 v. terminal.

A resistor 123 is connected between resistor 106 and reference diode 108 and through a diode 124 to lead 104.

Resistor 82 is connected through a reference diode 125 and a resistor 126 to the comparator 48 and a resistor 127 connected through a capacitor 128 to lead 104.

The ramp generator 63 is provided with an integrating capacitor 129.

As shown in the drawing, the oscillator 52 includes resistor 131 and capacitor 135 for timing control. A capacitor 136 is connected further from the oscillator to the −12 v. supply, as shown.

Resistors 106, 123 and 109 are selected so that if the battery voltage is below 32 volts, the control circuit will not commence operation under the control of the reference diode 108. If the battery voltage when the control is connected thereto is above 32 volts, the transistors 113 and 107 will be biased in the slow-start circuit defined thereby so as to begin charging the capacitor 128.

When the capacitor is fully discharged, it permits a zero duty cycle in the control and as it charges up, the duty cycle slowly increases so that when fed through the control comparator 48, begins to increase the duty cycle of the alternating current delivered to the transformer 13. When the duty cycle becomes high enough so as to cause the regulated voltage on regulators 30 and 36 to be 15.9 v, the regulation of the control circuit is then commenced as discussed above.

When the vehicle is in the charging mode so as to recharge the vehicle battery, or in the process of motoring, selected contactor coils of the control circuit are connected to the +15.9 v and −15.9 v output terminals so that during both the motoring mode and recharging mode, the control circuit, through the energization of the contactor coils, provides a load so as to cause the desired control of the fan motor 10. Thus, as discussed above, when a relative high load is provided as a demand on the control circuit, the fan is cuased to operate at high power and at relatively high speed to provide an effectively maximum amount of cooling of the control circuit. When the contactors and main load components, such as gate drivers, are disconnected from the control circuit, the capacitors 19, 20 and 21 may charge readily to their peak voltage so as to provide a requirement of minimum duty cycle on the inverting circuit. Thus, while the volt-second output waveform of the inverter providing the power supply to the fan motor and to inductors 25 and 26 is effectively maintained over wide ranges of battery voltage, the duty cycle, under light load conditions of the control, is very low so as to provide relatively low power to the fan motor and thereby cause the cooling action to be correspondingly minimized and thereby cause a correlation between the cooling effect and the heating effect in the control circuit.

The invention comprehends the provision of this automatic control as an automatic function of the sagging of the desired 15.9 v (or other selected) control circuit voltage with the control circuit functioning so as to attempt to maintain the desired voltage by effecting corresponding changes in the duty cycle so as to effectively maintain the volt-second characteristics of the control circuit.

The foregoing disclosure of specific embodiments is illustrative of the broad inventive concepts comprehended by the invention.

We claim:

1. For use in an apparatus having a battery power supply, a control connected to said battery power supply and having variable means for providing direct current from said power supply to a variable load, and an air moving means for cooling the control, the improvement comprising:
    an alternating current motor for driving the air moving means; and
    circuit means including inverter means for providing from said battery power supply a variable duty cycle alternating current control power supply to said motor having a substantially constant volt-second characteristic, said circuit means including means for varying the duty cycle of the inverter means and thereby causing the power developed by said motor to vary as a function of the load demand.

2. The apparatus of claim 1 wherein said circuit means includes comparator means for varying the duty cycle of the inverter means as a function of the operating condition of the control.

3. The apparatus of claim 1 wherein the load comprises a substantially inductive load.

4. The apparatus of claim 1 wherein means are provided for causing the duty cycle of the inverter output to increase from zero to that necessary to meet the load demand upon initiating operation of the apparatus.

5. The apparatus of claim 1 wherein said circuit means maintain the voltage applied to said air moving means motor substantially constant.

6. The apparatus of claim 1 wherein said circuit means includes oscillator means providing a preselected frequency of operation of the inverter means.

7. The apparatus of claim 1 wherein said inverter means comprises oscillator means for providing pulses at a preselected frequency and duty cycle, a comparator, means providing a variable voltage signal to the comparator, means for providing a repetitive ramp signal to the comparator to produce a duty cycle output signal from the comparator, an inverter, a pair of control gates connected to the inverter, and a toggle flip-flop alternatively enabling said control gates as a function of the oscillator pulse frequency for delivering the duty cycle output signal through said pair of control gates to the inverter for producing an alternating current power supply output having a duty cycle varying in accordance with said variable voltage signal provided to the comparator, and a single pulse-per-cycle flip-flop to permit said duty cycle output signal from the comparator to turn said single pulse-per-cycle flip-flop off, said single pulse-per-cycle flip-flop being turned on by a pulse from said oscillator means and remaining off subsequent to being turned off by said comparator until the next pulse from said oscillator means is delivered to said single pulse-per-cycle flip-flop, thereby preventing noise on the comparator duty cycle output signal from enabling said control gates.

8. The inverter circuit of claim 7 wherein said inverter defines alternate current conducting paths and said inverter circuit further includes means for providing blanking pulses to the control gates for preventing simultaneous conduction through both paths of the inverter.

9. The inverter circuit of claim 7 further including means for converting the duty cycle output to a regulated direct current voltage.

10. For use in an apparatus having a battery power supply, a control connected to said battery power supply and having variable means for providing direct current from said power supply to a variable load, and an air moving means for cooling the control, the improvement comprising:
    an alternating current motor for driving the air moving means; and
    circuit means including inverter means for providing from said battery power supply a variable duty cycle alternating current power supply to said motor for powering said air moving means, said circuit means including capacitor means for providing a direct current power supply to the control at a preselected control voltage, and means responsive to a sag in the direct current power supply voltage to the control to vary the duty cycle of the inverter means to regulate the control power supply voltage and effectively maintain a substantially constant volt-second output waveform of the inverter means, said circuit means including means responsive to a sag in said control power supply for varying the duty cycle of the inverter means and thereby causing the power developed by said motor to vary as a function of the load demand.

11. The apparatus of claim 10 wherein said circuit means responsive to the voltage includes a ramp signal generator and a comparator for providing a variable pulse width signal to the inverter as a function of the voltage sag.

12. The apparatus of claim 10 wherein said circuit means responsive to the voltage includes a ramp signal generator and a comparator for providing a variable pulse width signal to the inverto as a function of the voltage sag and flip-flop means connecting the comparator to the inverter for providing a single pulse to the inverter each cycle.

13. The apparatus of claim 10 further including means for limiting the control current for preventing damage to the inverter from excessive current demand.

14. The apparatus of claim 10 further including means for causing the duty cycle to be minimum at start-up of the apparatus and to build up to the duty cycle necessary to meet the load demand.

15. The apparatus of claim 10 wherein said circuit means includes a transformer, said air moving means motor being connected to the transformer.

16. The apparatus of claim 10 wherein said means responsive to a sag in the control power supply voltage includes regulator means for providing a signal to the inverter for effecting a duty cycle adjustment thereof corresponding to said sag.

17. The apparatus of claim 10 wherein said means responsive to a sag in the control power supply voltage has a ramp generator and comparator for producing a signal to the inverter for effecting a duty cycle adjustment thereof corresponding to said sag.

18. In a direct current power supply having a plurality of output lines and an inverter connected to a variable voltage direct current input for providing an alternating current output to a rectifier, the improvement comprising:

an inductive-capacitive filter coupling the rectifier to the output lines to provide a plurality of opposite polarity substantially equal value pulsed direct current voltages therein; and means for controlling the duty cycle of the inverter in response to a sag in either of the output line voltages below a preselected value thereof to cause a suitable change in the duty cycle to increase the direct current voltage thereof to the preselected value for maintaining the volt-second characteristics of each of the output direct current voltages substantially equal.

19. The direct current power supply of claim 18 wherein said output lines comprise a pair of lines and the direct current voltage therein are equal and opposite polarity voltages.

20. The direct current power supply of claim 18 wherein regulator means are provided for maintaining the volt-second output of the inverter.

* * * * *